United States Patent Office 3,481,744
Patented Dec. 2, 1969

3,481,744
PROCESS FOR THE PRODUCTION OF A
TEA EXTRACT
André Giddey, La Tour-de-Peilz, and Luc Vuataz, Vevey,
Switzerland, assignors to Afico S.A., Lausanne, Switzerland, a corporation of Switzerland
No Drawing. Filed Dec. 6, 1966, Ser. No. 599,392
Claims priority, application Switzerland, Dec. 9, 1965,
17,028/65
Int. Cl. A23f 3/02
U.S. Cl. 99—77　　　　　　　　　　　　　　　11 Claims

ABSTRACT OF THE DISCLOSURE

Tea extract which remains clear upon reconstitution with hard water, prepared by treating soluble tea solids with tea extract which is at least partially decationized and a calcium salt which does not leave a residual anion in the final extract.

---

The present invention is concerned with the production of tea extracts.

Tea extracts, generally in powder or paste form, may be prepared from gresh green tea or from fermented tea (black tea). It has been observed that extracts prepared from fresh leaf have certain desirable qualities, notably with respect to flavour and aroma. However, such extracts, as well as those prepared from black tea, tend to form an undesirable foam on the surface of the reconstituted liquor, or to give solution which is cloudy, upon reconstitution with waters of high calcium content. This phenomenon is particularly noticeable when the reconstituted liquors are cooled.

The object of the present invention is to provide tea extracts which are substantially unaffected by hard waters, that is, they remain clear upon reconstitution with such waters and do not form a scum.

The present invention accordingly provides a process for the production of tea extracts which comprises the step of treating soluble tea solids (as herein defined) with a tea extract which is at least partially decationised and a calcium salt which does not leave a residual anion in the final extract.

By "soluble tea solids" are meant tea solids which are present in fermented or unfermented tea leaves as well as solids present in an extract prepared from such leaves. Thus, the process according to the present invention may be effected before or after extraction of said solids; preferably, however, it is carried out before extraction.

Furthermore, the process of the present invention may be applied in the production of extracts from black tea as well as from fresh leaf. The expression "fresh leaf" as used herein is intended to mean not only freshly picked tea leaves but also leaves which have been subjected to a treatment such as, for example, withering. In general, the expression denotes tea leaves in which the natural enzymes are still active.

Preferably, the decationised extract (partially or totally) is a fresh leaf extract. Such an extract may for example be prepared from fresh leaf, by comminuting the leaf, extracting the soluble solids with water at about 100° C. and removing the insoluble matter by any suitable means, such as filtration or centrifuging. The decationisation of the extract may be effected by ion exchange treatment, for example by passing the extract containing a suitable ion-exchange resin in hydrogen form. Especially suitable for this operation is a resin known as Amberlite IR 120. Preferably, the pH of the extract after ion-exchange treatment should be below 4.5.

As the treatment according to the invention involves a chemical reaction, it is desirable to work at temperatures slightly above ambient, for example at 35-40° C.

The preferred calcium salts which may be used in the process according to the present invention are the oxide, hydroxide, carbonate or bicarbonate, the last mentioned salt being found in some natural waters. The quantity of calcium salt added may be up to 1% by weight of the tea solids. This figure, however, is only given by way of example since the quantity of salt will depend on the type of leaf used. In general, the quantity of salt to be added, calculated as calcium, will be between 0.1 and 0.8% by weight of the dry matter present in the tea. It should furthermore be noted that a smaller amount of calcium salt is to be used when the treatment is effected after extraction.

A partially or totally decationised tea extract may also be prepared by enclosing the resin used in a permeable bag and stirring the bag in a suspension of black tea or fresh leaf. This procedure has the advantage of simplifying the separation of the resin from the tea.

The decationised extract may also be prepared, according to the invention, by extracting tea (black or fresh) with decationised water.

According to a further embodiment of the process, the calcium salt may be mixed with a quantity of partially or wholly decationised extract and the mixture then added to the soluble tea solids.

In another embodiment, a suspension of comminuted tea is prepared using as liquid phase an extract obtained from partially spent leaf, which liquid has been partially decationised, the calcium salt is added in an amount which corresponds to the tea solids present and the soluble matter is extracted. The quantity of calcium salt to be added may also be calculated from the pH of the mixture.

When the tea extract is prepared from fresh leaf, for example by the processes described in British Patent No. 1,034,670 or in our application No. 548,427 filed May 9, 1965, the calcium salt may be added at different stages of the process, for example after maturing, after stripping of aromatics or after fermentation, but preferably before extraction. When the treatment according to the invention, that is the addition of a calcium salt and decationised extract, is effected after fermentation, it is preferable to use an unfermented extract which has been decationised.

The following examples are given for the purposes of illustration only.

EXAMPLE 1

Fresh tea leaves are comminuted in a suitable apparatus, in decationised water and in the presence of an extract obtained from partially spent leaves. The extraction is effected by heating the suspension to 100° C., separating the insolubles and clarifying the liquor by centrifuging. The leaves recovered may be used for the preparation of a second extract.

After centrifuging, a quantity of extract corresponding to 0.125 kg. of fresh leaf containing 80% moisture is passed through a column containing 10 ml. of cation exchange resin in hydrogen form (Amberlite IR 120). The pH of the extract is thus reduced to 2.2.

The unfermented decationised extract, together with 0.35 g. of calcium, in the form of carbonate, is added with gentle stirring to a suspension corresponding to 0.25 kg. of fresh leaves containing 80% moisture which had previously been matured, stripped and fermented as described in application No. 548,427, Example 1, second variant. The suspension is stirred at 40° C. for 15 minutes; the pH is 5.2, which corresponds to the pH after fermentation.

The soluble tea solids are then extracted by heating the suspension to 100° C. Finally, the clarified extract is spray-dried to provide a powdered soluble tea extract.

For the purposes of comparison, two further extracts were also prepared. For the first, the quantities of unfermented decationised extract and calcium carbonate added to the suspension were halved, and a quantity of unfermented non-decationised extract equal to the quantity of unfermented decationised extract was also added. In the second, only unfermented non-decationised extract was added to the suspension, in a quantity corresponding to 0.125 kg. of fresh leaf containing 80% moisture.

450 mg. portions of each extract were reconstituted with 100 ml. of hard water which had been brought to the boil. The solution prepared with the first extract is perfectly clear, the one prepared with the second extract is opalescent whereas the third is distinctly cloudy with a scum on its surface.

EXAMPLE 2

An unfermented extract is prepared as described in Example 1, except that after removal of the insolubles the liquid is not clarified but centrifuged for a short time to remove the chloroplasts. A nylon mesh bag containing Dowex 50–X–16 cation exchange resin in hydrogen form is immersed in the extract. The conditions are selected to give a final pH in the extract of 3.5. Sufficient calcium hydroxide is then added to the decationised extract to raise its pH to 5.5.

Separately, a suspension containing 0.25 kg. of fresh tea leaves (80% moisture) and 0.75 kg. tap water containing 0.008% calcium is prepared. A sufficient quantity of partially decationised unfermented extract which has been neutralised with calcium hydroxide is added to this suspension to give a total calcium concentration, including that present in the hard water, of 0.25% calculated on the weight of the tea dry matter. The solution is stirred slowly for 10 minutes at 30° C.; the pH is 5.5.

Finally, the soluble solids are extracted by heating the suspension to 100° C., the insoluble matter is separated and the clarified extract is roller-dried under reduced pressure. The resulting powder, on reconstitution with tap water which has just been brought to the boil, provides a solution which is much clearer than one which has been prepared with a powder obtained by a similar process but which does not involve the treatment with calcium salt and addition of decationised extract.

EXAMPLE 3

Comminuted tea leaves are suspended in a liquor obtained by extracting partially spent tea leaves with decationised water. This suspension, containing 4.8% dry matter and having a pH of 5.3, is fermented with vigorous stirring for 20 minutes at 35° C. During the fermentation, a quantity of air equal to three times the volume of the suspension is bubbled in. The pH at the end of the fermentation is 4.8. After slowing the rate of stirring and cutting off the air supply, a nylon gauze bag containing a cation exchange resin in hydrogen form (Dowex 50–X–16) is immersed in the suspension until the pH drops to 4.0. The resin is then removed and sufficient calcium carbonate is added to give a calcium concentration corresponding to 0.5% of the tea dry matter. The suspension is stirred for 30 minutes at 40° C., whereupon the pH rises to 4.8. The suspension is then heated to 95° C., the insoluble matter is removed and the extract is clarified by centrifuging. Finally, the clarified extract is spray-dried to provide a powdered tea extract which is substantially insensitive to hard waters.

EXAMPLE 4

A tea extract is prepared from 30 kg. of black tea, by the process described in British Patent No. 946,346. The extract is passed, at 40° C., through a column containing 10 litres of cation exchange resin in hydrogen form (Amberlite IR 120). The extract enters at the bottom of the column, at a rate such that the resin particles are lifted slightly. Obstruction of the column by the substances which precipitate as a result of the lowering of the pH is thus avoided. The pH of the extract leaving the column is 2.3.

The decationised extract thus obtained is mixed with an aqueous suspension of 70 kg. of black tea together with 1 kg. of calcium in the form of calcium carbonate. The mixture is stirred for 15 minutes at 40° C. and the extraction and drying are carried out as described in British Patent No. 946,346.

In one modification, the process is repeated except that a decationised extract obtained from 15 kg. of black tea is added to an aqueous suspension containing 85 kg. of black tea, together with 0.5 kg. of calcium. In a second modification, no calcium is added, but only the non-decationised black tea extract.

450 mg. portions of each of the three extracts thus produced are constituted with 100 ml. of hard water which has been brought to the boil. The solution prepared with the first powder is absolutely clear, the second is opalescent, whereas the third product, prepared without addition of calcium, yields a solution which is cloudy.

It will be seen from this example that the improvement in the product is proportional to the quantity of calcium added.

We claim:

1. In a process for the production of tea extracts, the step of treating soluble tea solids with a tea extract which is at least partially decationized by ion exchange treatment and a calcium salt which does not leave a residual anion in the final extract, said extract being acidic by reason of said decationisation; the duration of said treatment, the amount of said decationised extract and the amount of said salt being sufficient to provide a treated extract which remains clear upon reconstitution with hard water and does not form a scum.

2. A process according to claim 1, in which the treatment is effected before the extraction of the soluble tea solids.

3. A process according to claim 1, in which the decationised tea extract is an extract prepared from fresh leaf.

4. A process according to claim 1, in which the pH of the decationised extract is below 4.5.

5. A process according to claim 1, in which the treatment is effected at a temperature of 35 to 40° C.

6. A process according to claim 1, in which the quantity of calcium salt used is up to 1% by weight of the total tea solids present.

7. A process according to claim 6, in which the quantity of calcium salt used is from 0.1 to 0.8% of the weight of tea solids.

8. A process for the production of a tea extract comprising the steps of preparing a suspension of comminuted tea in a liquor obtained by extracting partially spent leaves, said liquor having previously been at least partially decationised by ion exchange treatment, adding a calcium salt to the suspension in an amount sufficient to provide a calcium content of about 0.1% to about 1% of the weight of the tea solids present in said suspension, extracting the soluble solids from said tea and recovering a tea extract the duration of said treatment being sufficient to provide a treated extract which remains clear upon reconstitution with hard water and does not form a scum.

9. A process according to claim 8, in which said comminuted tea is fresh green tea.

10. In a process for the production of tea extracts, the step of treating soluble tea solids at a temperature of 35 to 40° C. with a tea extract which has been at least partially decationised by ion exchange treatment to a pH which is below 4.5 and with a calcium salt which does not leave a residual anion in the final extract, the quantity of calcium salt, calcuated as calcium, being from about 0.1% to about 1% by weight of the tea solids present, the duration of said treatment being sufficient to provide a treated extract which remains clear upon reconstitution with hard water and does not form a scum.

11. A process according to claim 10, in which the partially decationised extract is prepared from fresh green tea.

References Cited

UNITED STATES PATENTS

| | | | |
|---|---|---|---|
| 2,852,388 | 9/1958 | Cortez | 99—77 |
| 2,891,866 | 6/1959 | Schroeder | 99—77 |

LIONEL M. SHAPIRO, Primary Examiner

J. R. HOFFMAN, Assistant Examiner